Dec. 1, 1925.  1,563,335
C. H. BUCKLER
SPRING SUSPENSION FOR MOTOR VEHICLES
Filed Feb. 4, 1922    4 Sheets-Sheet 1
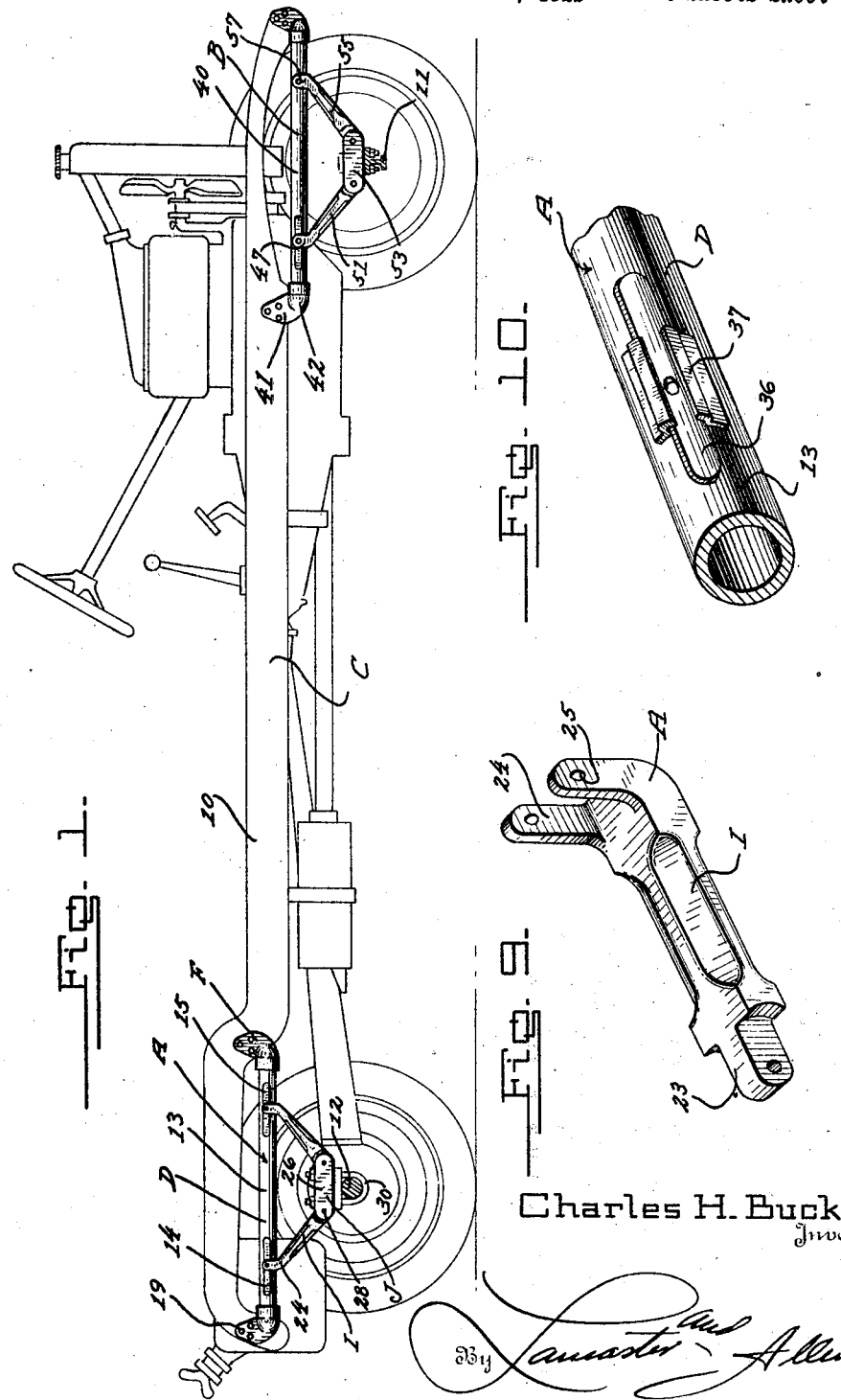
Charles H. Buckler
Inventor Dec. 1, 1925.
C. H. BUCKLER
SPRING SUSPENSION FOR MOTOR VEHICLES
Filed Feb. 4, 1922
1,563,335
4 Sheets-Sheet 2
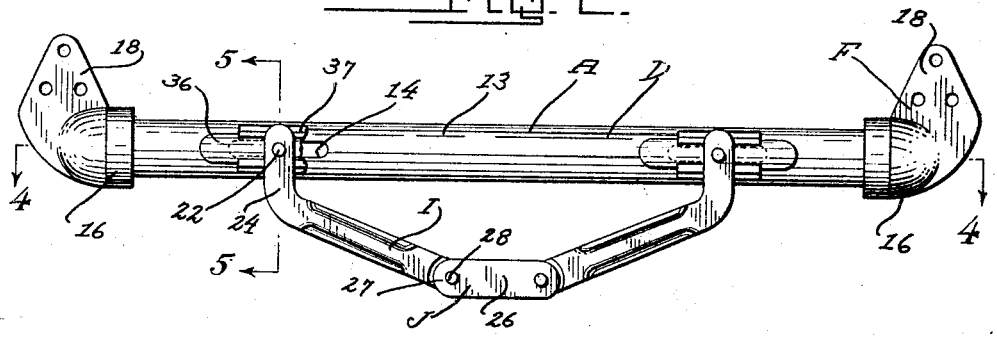
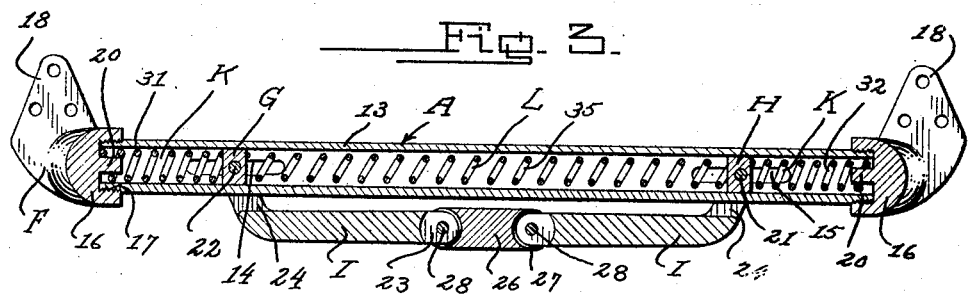
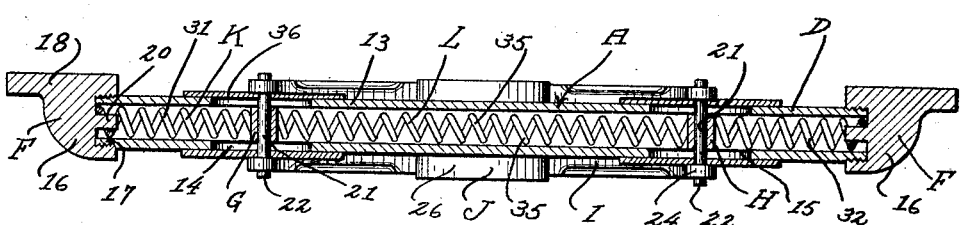
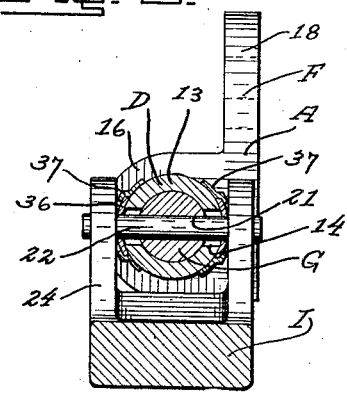
Charles H. Buckler
Inventor
Attorneys Dec. 1, 1925.
C. H. BUCKLER
1,563,335
SPRING SUSPENSION FOR MOTOR VEHICLES
Filed Feb. 4, 1922
4 Sheets-Sheet 3
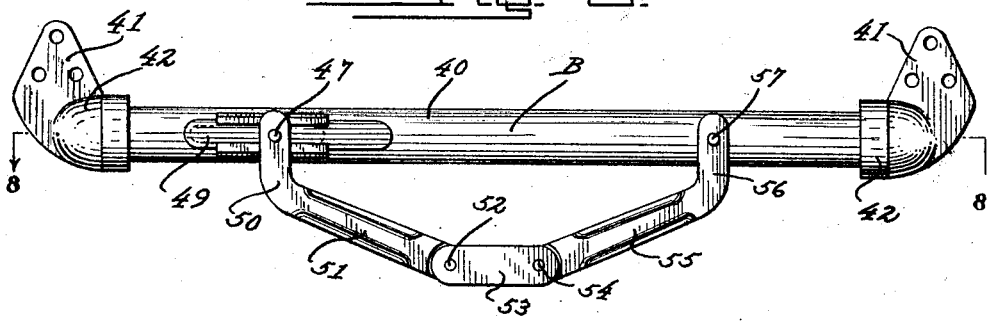
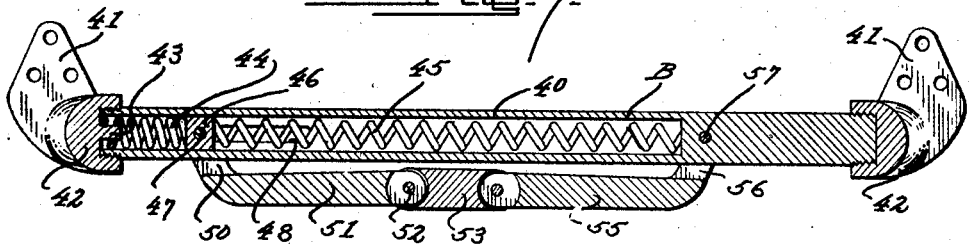
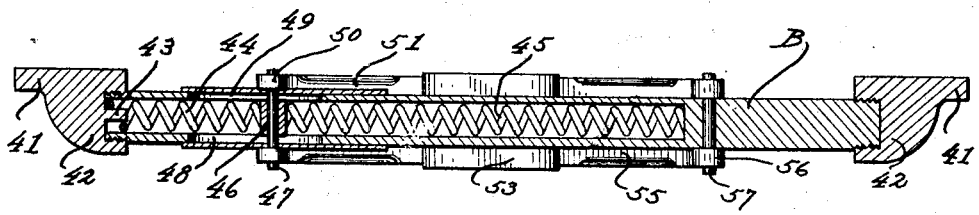
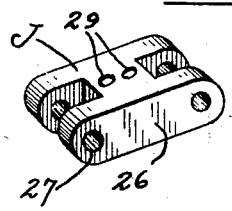
Charles H. Buckler
Inventor

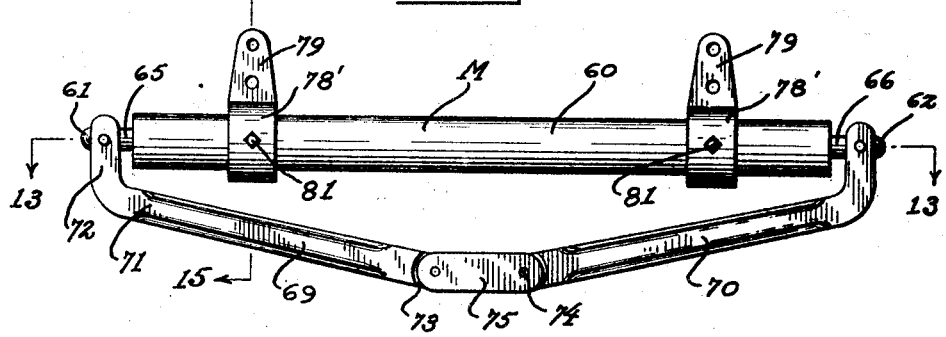
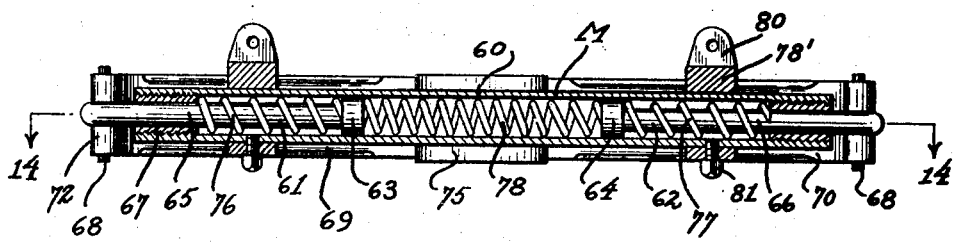
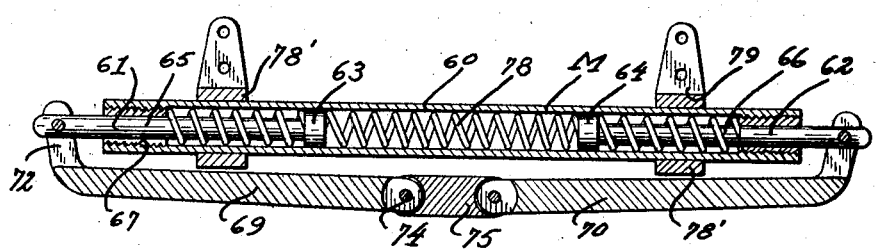
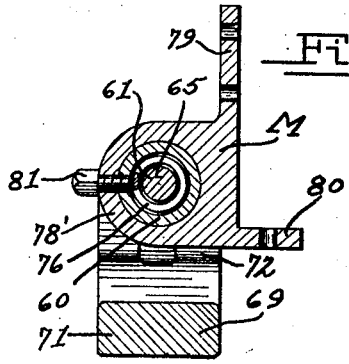

Patented Dec. 1, 1925.

1,563,335

UNITED STATES PATENT OFFICE.

CHARLES H. BUCKLER, OF CAMDEN, NEW JERSEY.

SPRING SUSPENSION FOR MOTOR VEHICLES.

Application filed February 4, 1922. Serial No. 534,191.

*To all whom it may concern:*

Be it known that I, CHARLES H. BUCKLER, a citizen of the United States, residing at Camden, in the county of Camden and State of New Jersey, have invented certain new and useful Improvements in Spring Suspensions for Motor Vehicles, of which the following is a specification.

This invention relates to motor vehicles, and more particularly to resilient suspension therefor, and the primary object of the present invention is to provide a novel means of resiliently connecting the supporting axles with the chassis or frame of the vehicle, whereby the use of leaf springs now universally in vogue will be dispensed with, therby eliminating the inconveniences contingent therewith such as the breakage thereof under rebound and the difficulty experienced with the proper lubrication thereof.

The great need of improvement in resilient suspension for motor vehicles is made apparent by the fact that manufacturers of automobiles first try one and then another of the known types of leaf spring suspensions in the different models of their cars and the manufacturers of high priced machines have finally incorporated shock absorbers with their cars as a partial relief.

It is therefore a prime object of the invention to provide an improved type of spring suspension for vehicles, in which the shock will be effectively alleviated or absorbed and which will eliminate the use of the so called shock absorbers now on the market which add to the cost of the car, and in which rebound after shock will be effectively taken care of, the improved invention entirely eliminating the difficulties experienced with broken springs.

A further object of the invention is the provision of novel means for operatively connecting the vehicle axle by the use of levers, with slide blocks associated with the chassis, and novel means for cushioning and checking the travel of the slide blocks.

A further object of the invention is the provision of an improved spring suspension for vehicles embodying a cylinder or cylinders, connected with the vehicle chassis, blocks slidably mounted in the cylinder or cylinders, shock and rebound absorbing means, such as helical springs or fluid mounted in the cylinders for acting against said blocks, and levers or arms connected to the blocks and to the vehicle axles, the levers being associated with the axles and blocks in such a manner that the active travel of the slide blocks will be considerably less than the active vertical travel of the axles when encountering obstructions during travel of the vehicle.

A further object of the invention is the provision of guide means for the pins utilized for connecting the levers or supporting arms with the slide blocks, and means for preventing the entrance of dust and road grit into the cylinders.

A still further object of the invention is to provide an improved spring suspension for motor vehicles, which will be durable and efficient in use, one that will be simple and easy to manufacture, one which can be incorporated with existing machines, as well as those in the course of manufacture, and one which will add to the appearance of the car.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of a motor vehicle chassis, showing two of the forms of the improved spring suspension connected thereto, parts of the chassis being shown in section.

Figure 2 is a side elevation of one form of my improved spring suspension.

Figure 3 is a vertical longitudinal section through the improved spring suspension, showing the position of the same under shock.

Figure 4 is a horizontal longitudinal section through the improved spring suspension taken on the line 4—4 of Figure 2.

Figure 5 is an enlarged detail transverse section through the improved spring suspension taken on the line 5—5 of Figure 2 and illustrating the means of mounting the guide blocks in the supporting cylinders, and the means of operatively connecting the supporting arms or levers to said supporting blocks.

Figure 6 is a side elevation of another form of the improved spring suspension.

Figure 7 is a vertical longitudinal section through the same, while under shock.

Figure 8 is a horizontal longitudinal section taken on the line 8—8 of Figure 6.

Figure 9 is a detail perspective view of one of the supporting arms or shock distributing levers.

Figure 10 is a fragmentary perspective view of one of the supporting cylinders.

Figure 11 is a detail enlarged perspective view of the block utilized for connecting the supporting arms or shock distributing levers together and to the vehicle axle.

Figure 12 is a side elevation of a further form of the improved spring suspension.

Figure 13 is a central horizontal section through the further modified form taken on the line 13—13 of Figure 12.

Figure 14 is a vertical central longitudinal section through the further modified form taken on the line 14—14 of Figure 13.

Figure 15 is an enlarged transverse section through the further modified form taken on the line 15—15 of Figure 12, illustrating the means of connecting the improved spring suspension to the motor vehicle chassis.

Referring to the drawings in detail, wherein similar reference characters designate corresponding parts throughout the several views, the letters A and B indicate two forms of the improved suspension; and C, a vehicle chassis with which the same can be associated.

While I have shown the form A connected to the rear end of the chassis C, and the form B connected to the front end of the chassis, and for which they are particularly adaptable, it is to be understood that both the forms can be effectively used at either end of the chassis.

The chassis C has been merely shown to illustrate the use of the improved suspension and can be of any type and as shown includes the side channel beams 10, the front dead axle 11 and the rear axle structure 12.

The improved suspension A includes the housing D; the means F for connecting the same to the chassis; the slide blocks G and H mounted in the housing D; the supporting and shock distributing levers I; the axle connecting means J; and the shock and rebound absorbing and cushion means K and L.

The housing D, by way of example, has been shown to consist of a hollow cylinder 13, which is disposed longitudinally of the chassis. This cylinder 13 adjacent to its opposite ends is provided with diametrically opposed slotted guide ways 14 and 15, the purpose of which will hereinafter more fully appear.

The means F utilized for connecting the cylinder 13 to the channel beams 10 of the chassis C have merely been shown by way of example, and it is to be understood that any other preferred type of connecting means can be provided. The means F as shown, consists of end caps 16, which are internally threaded as at 17 for the reception of the threaded terminals of the cylinder 13. The caps 16 have cast or otherwise formed thereon attaching face plates 18, which can be riveted or bolted, as at 19, to the side beams 10. Thus it can be seen that the means F perform the dual function of connecting the cylinder 13 to the chassis, as well as forming closing means for the terminals thereof. The caps 16 can be provided at their axial centers with lugs 20, the purpose of which will also be hereinafter more fully described.

The slide blocks G and H may be of any desired form, and are, as shown, of substantially cylindrical shape, so as to snugly fit in the cylinder 13, and can be provided with transverse bores 21 for the transverse supporting pins 22, utilized for connecting the supporting arms or shock distributing levers I with the blocks.

The supporting and shock distributing levers I are disposed on the opposite sides of the transverse center of the cylinder 13, and their inner ends are reduced in width to provide lugs 23, while their outer ends are provided with upwardly extending substantially right angularly disposed ears 24. These ears 24 are adapted to embrace the opposite sides of the cylinder 13 adjacent to the opposite ends thereof and these ears can be provided with openings 25 for the reception of the pivot pins 22.

The means J for operatively connecting the shock distributing levers I together and to the axles of the vehicle consist of blocks 26, which may have their opposite terminals bifurcated to provide ears 27 between which the lugs 23, formed on the inner terminals of the levers I are adapted to fit. These ears 27 and the lugs 23, can be provided with aligned openings, for the reception of pivot pins 28. The central portion of the blocks 26 at the longitudinal axis thereof can be provided with vertical openings 29, and these openings 29 are adapted to receive the shank portions of shackles 30, which can be extended around the axles of the vehicle, in order to effectively connect the axles with the shock distributing levers I. While I have shown shackles 30 for connecting the block J to the axles, it is to be understood that other means can be utilized without departing from the spirit or scope of this invention, and it is apparent that these blocks may be recessed to receive the axle, or the axles themselves may be provided with pivot ears for engaging the sides of the lugs 23 of the levers I, thus entirely eliminating the necessity of providing the said blocks 26.

The shock and rebound absorbing and cushioning means K and L have been shown to be helical springs, but it is also obvious that fluid cushioning means can be substituted therefor, and I therefore do not wish to limit myself to the springs as shown in the drawings.

The shock absorbing and cushioning means K consist of helical springs 31 and 32, which are disposed at each end of the cylinder 13 and engage the outer faces of the slide blocks G and H and the inner faces of the cap portions 16 of the connecting means F. The lugs 20 act as centering means for the springs 31 and 32. The springs are of a relatively heavy type, and it is apparent that the same may be of any desired size so as to withstand any desired pressure or load which the vehicle is likely to sustain.

The springs 31 and 32 are of the expansion type and are normally under tension and thus exert a pressure on the slide blocks G and H and hold the connecting means J in lowermost position as clearly shown in Figure 2 of the drawings. It is desirable that the springs be under sufficient tension to normally support the weight of the vehicle body. It is obvious that when shock is transmitted to the connecting means J from the axle, that the block J will be forced upwardly as shown in Figure 3 of the drawings, which will press outwardly on the slide blocks G and H, and thus the springs 31 and 32 will absorb the shock transmitted to the blocks and effectively check the travel thereof. From the construction of the arms or shock distributing levers I, the travel of the slide blocks G and H is considerably less than the vertical travel of the connecting means J. It also can be seen that the shock transmitted to the connecting means J will be equally distributed to the springs 31 and 32.

The rebound cushioning means L as shown, consists of a longitudinally extending helical spring 35 of the compression type and this spring is disposed in the cylinder 13 intermediate the slide blocks G and H and can be, if so desired, under sufficient tension to follow the slide blocks G and H during their outward travelling movement. It is obvious that during the retrograde movement of slide blocks G and H that the means L will check the travel of these blocks and thus effectively eliminate all rebound in the improved suspension device. There is, of course, to be one of the improved suspension devices for each wheel and these devices are disposed on opposite sides of the chassis, as clearly shown in Figure 1 of the drawings.

The pins 22 are normally located in the central portion of the slots 14 and 15, and are free to travel longitudinally thereof. In order to prevent the entrance of dust, road grit and the like into the cylinders 13 through the slots 14 and 15, suitable guard plates 36 are provided. These guard plates 36 are arcuate shaped in cross section so as to conform to the transverse configuration of the cylinders 13 and are provided with openings intermediate their ends for the reception of pins 22. In order to guide the plates 36 in their sliding movement with the pins 22, guide tracks 37 are provided. The guide tracks 37 are disposed longitudinally of the cylinders and are arranged at the upper and lower walls of the slots as clearly shown in Figures 2, 4 and 5.

The improved suspension B is constructed along the same principle as the spring suspension A with the exception that the shock distributing levers thereof do not function in the same manner, in that only one is free to move longitudinally of the cylinder.

The improved spring suspension B includes a cylinder 40 which is constructed the same as the cylinder 13 and is secured in place by means of face plates 41 which carry caps 42 for the reception of the ends of the cylinder 40. This connecting means is also the same as the connecting means F disclosed in the form A. One cap 42 is provided with the centering lug 43, while the other cap can be formed without this lug, inasmuch as the end of the lever which fits its support can be formed solid if so desired. This cylinder 40 has mounted therein a single shock absorbing spring 44, which is shown to be of the helical type, and a rebound absorbing spring 45, which is also shown to be of the helical type. Intermediate the springs 44 and 45 is disposed a single slide block 46, which carries the pivot pin 47. This pivot pin 47 extends outwardly of the cylinder 40 and is mounted in suitable guide slots 48. These guide slots may be normally closed by suitable guard plates 49, which are similar to the guard plates 46. The pin 47 is pivotally connected to the angularly disposed ears 50, which are formed on the outer end of one shock distributing lever 51, which extends downwardly and inwardly of the cylinder 40. This arm or lever 51 has pivotally secured to its inner end as at 52, the attaching block 53, which can be secured in the same manner to the axle as the connecting means J in the form A. The other end of the block 53 has pivotally connected thereto by a pin 54, a second shock distributing arm 55, which is also provided with upwardly extending angularly disposed ears 56, which engage the opposite sides of the cylinder 40 and are connected thereto by means of a pivot pin 57. This pivot pin is supported for nonsliding movement by the cylinder.

The operation of the suspension B is substantially the same as the operation of the suspension A, in that when shock is transmitted to the block 53, the same moves upwardly toward the cylinder B and will thus force the arm or lever 51 upwardly and outwardly which will slide the block 46 in the cylinder 40 against the tension of the spring 44, which will effectively absorb and cushion the shock. The rebound will be effectively cushioned and absorbed by the spring 45, which bears against the opposite face of the block 46, from that which is engaged by the spring 44. It can be seen in this form that the arm 55 does not slide longitudinally of the cylinder, as in the form A.

When the improved suspension is under full load, the block 53 and the arms or levers 51 and 55 will occupy the position shown in Figure 7 of the drawings.

In Figures 12 to 15 inclusive, is shown another form of the improved suspension, which embodies the same principle of operation as the forms A and B, and this form is designated by the letter M.

The improved form M includes essentially a longitudinally extending hollow cylinder 60, which is also disposed longitudinally of the chassis of the vehicle, and this cylinder 60 has slidably mounted therein, the opposed plungers 61 and 62, each of which includes heads 63 and 64 and stems or rods 65 and 66. The rods 65 and 66 of the plungers 61 and 62 extend outwardly from the opposite ends of the cylinder 60 and the opposite ends of the cylinders can be provided with bearings or guides 67 for the rods. As shown these guides 67 are threaded into the ends of the cylinder although the same may be connected thereto in any preferred manner. The terminals of the rods or stems 65 and 66 have pivotally connected thereto by means of pivot pins 68, shock distributing levers 69 and 70. These levers 69 and 70 have substantially the same configuration as the levers shown in the forms A and B, and consists of body portions 71, the outer ends of which are provided with angular extending ears 72 and the inner ends with lugs 73. The ears 72 are connected by means of pins 68, with the rods 65 and 66. The lugs 73 formed on the inner ends of the levers 69 and 70 are connected by means of pivot pins 74 with the connecting block 75, which can be connected by means of shackles or the like to the axles as in the form A. The form M is also provided with shock absorbing and rebound cushioning means, and the shock absorbing means consist of helical springs 76 and 77, which are coiled respectively about the rods 65 and 66, and these springs bear against the heads 63 and 64 and against the guides 67 for the rods and normally maintain the rods toward the central portion of the cylinder 60.

The rebound cushioning means consist of a helical spring 78 which is disposed between the heads 63 and 64 and this spring will effectively cushion the rebound.

It is obvious that when the shock is transmitted to the block 75 that the same will be forced upwardly in a vertical path, which will force outwardly on the arms 69 and 70 which will in turn draw out on the plungers 61 and 62, which will tend to compress the expansion springs 76 and 77. Thus these springs will check the travel of the plungers 61 and 62 and effectively absorb the shock. When the plungers tend to resume their normal position, the same will act against the spring 78, which will effectively check the inward travel of these plungers and thus prevent any rebound.

The cylinder 60 can be connected in any preferred manner with the chassis of the vehicle and as shown cuffs 78′ are provided for surrounding the cylinder 60 and these cuffs are disposed adjacent to each end thereof and are provided with attaching brackets or plates 79 and 80. These plates 79 and 80 can be riveted, bolted, or otherwise secured to the side beams of the chassis. It is to be also understood in this form, that a cushioning device is provided for each wheel and that these cushioning devices are located on the opposite sides of the chassis. The cuffs 78′ can be secured to the cylinder in any preferred manner, and as shown set screws 81 are provided for this purpose, and these screws 81 may extend entirely through the cuffs and into the cylinder 60

From the foregoing description, it can be seen that an exceptionally simple spring suspension has been provided for motor vehicles, in which the use of leaf springs is entirely eliminated, and in which the shock and rebound is entirely taken care of by helical springs which is transmitted thereto by novel shock distributing levers which are connected to the vehicle axle.

Changes in details may be made without departing from the spirit or scope of this invention; but,

I claim:

1. In a motor vehicle the combination with the chassis frame thereof and axle, of resilient suspending means for connecting the chassis frame with the axle, said suspending means comprising a casing extending longitudinally beneath the chassis and forwardly and rearwardly of the axle, arms pivotally mounted on opposite sides of the axle and extending forwardly and rearwardly therefrom toward the opposite ends of the casing and having their outer ends pivotally connected with the casing, the means for pivotally mounting the outer end of one arm consisting of a block slidably mounted in the casing and having pivot means extending externally of the casing and engaged with the arms, means being provided in said casing for yieldably resisting sliding of the block in one direction and means being provided in the casing for yieldably resisting sliding of the block in an opposite direction.

2. In a motor vehicle, the combination with the chassis thereof including a frame and an axle, of a resilient suspension for connecting the frame with the axle including a housing carried by the frame and extending forwardly and rearwardly of the axle, means slidably mounted in the housing, shock absorbing and cushioning means disposed in the housing and acting against said means slidably mounted in the housing, connecting means uniting the axle with the means slidably mounted in the housing, and cushioning means disposed in the housing for eliminating rebound of the members slidably mounted in the housing after the transmission of shock thereto.

3. In a motor vehicle, the combination with the chassis thereof including side beams, and axles, of a resilient suspension device for connecting the side beams with the axles including housings connected with and disposed longitudinally of the chassis, slide members disposed in the housings for movement longitudinally thereof, means connecting the axles with the slide members, cushioning means being provided in the housing between the sliding members and ends of the housing for absorbing shock, and cushioning means being provided in the housing between the sliding members for acting against said slide members to check the travel thereof after the transmission of shock thereof.

4. In a motor vehicle, the combination with the chassis thereof including side channel beams and axles, of a resilient suspension device for connecting the side channel beams with the axles including cylinders disposed longitudinally of the side channel beams and connected therewith and extending forwardly and rearwardly of the axles, slide members disposed in the cylinders for longitudinal movement thereof, means mounted in the end portions of the cylinders for absorbing shock and in the intermediate portions of the cylinders for preventing rebound of the slide members, and connecting means pivotally connected to the slide blocks at their outer ends and to the axles at their inner ends.

5. As a new article of manufacture, a resilient suspension for motor vehicles comprising a cylinder having opposed side slots, means carried by the cylinder for connection with the chassis of a vehicle, slide members mounted in the cylinder for movement longitudinally thereof, pins carried by the slide members and extending transversely thereof and through the slots of the cylinder, shock absorbing and cushioning springs disposed in the cylinder and engaging the outer faces of the slide members, rebound and cushioning means disposed in the cylinder intermediate the slide members and engaging the inner faces thereof, shock distributing levers pivotally connected to the outer end portions of the pins carried by the slide blocks and extending in converging relation toward the transverse center of the cylinder, and means pivotally connecting the inner ends of the shock distributing levers for permitting the connection thereof with a vehicle axle.

6. In a motor vehicle suspension, a cylinder, means carried by the cylinder for permitting the connection thereof with a vehicle chassis, blocks slidably mounted in the cylinder for longitudinal movement and disposed on opposite sides of the transverse center of the cylinder, the cylinder being provided with guide slots, guide and pivot pins carried by said slide blocks and extending outwardly of the cylinder through said slots, shock absorbing and cushioning springs disposed in the cylinder and engaging the outer faces of the blocks, a rebound and cushioning spring disposed in the cylinder intermediate the slide blocks engaging the inner faces thereof, an axle connecting block, shock distributing levers, means connecting the inner ends of the levers to the block, the outer ends of the levers having angularly disposed attaching ears formed thereon adjacent the cylinders and receiving said pivot pins.

7. In a motor vehicle suspension, a cylinder, means carried by the cylinder for permitting the connection thereof with a vehicle chassis, blocks slidably mounted in the cylinder for longitudinal movement and disposed on opposite sides of the transverse center of the cylinder, the cylinder being provided with guide slots, guide and pivot pins carried by said slide blocks and extending outwardly of the cylinder through said slots, shock absorbing and cushioning springs disposed in the cylinder and engaging the outer faces of the blocks, a rebound and cushioning spring disposed in the cylinder intermediate the slide blocks engaging the inner faces thereof, an axle connecting block, shock distributing levers, means connecting the inner ends of the levers to the block, the outer ends of the levers having angularly disposed attaching ears formed thereon adjacent the cylinders and receiving said pivot pins, and guard plates carried by said pins arranged to normally close the guide slots in the cylinders.

8. In a motor vehicle suspension, a cylinder adapted for connection with a vehicle chassis, a block slidable longitudinally in the cylinder, the cylinder being provided with guide slots in its side portions, a pin disposed transversely of the block and extending from the block through the slots, shock absorbing and cushioning springs disposed in the cylinder upon opposite sides of the slide block, an axle engaging member, and a shock distributing lever having one end pivotally connected with said axle engaging member and its other end provided with attaching ears extending upon opposite sides of said cylinder and pivotally engaged with the outer end portions of said pin.

9. The structure of claim 8 having the cylinder provided with longitudinally extending track members above and below the side slots, and guard plates for the slots slidable longitudinally of the cylinder between the track members in covering relation to the slots and having perforations receiving the end portions of the pin to operatively connect the plates with the pin.

CHARLES H. BUCKLER.